United States Patent [19]

Tsuria

[11] Patent Number: 5,786,845
[45] Date of Patent: Jul. 28, 1998

[54] CATV MESSAGE DISPLAY DURING THE CHANGING OF CHANNELS

[75] Inventor: Yossi Tsuria, Shoham, Israel

[73] Assignee: News Datacom Ltd., Berkshire, England

[21] Appl. No.: 556,024

[22] Filed: Nov. 13, 1995

[30] Foreign Application Priority Data

Nov. 11, 1994 [IL] Israel .................. 111610

[51] Int. Cl.$^6$ ............................ H04N 7/16
[52] U.S. Cl. .................. 348/9; 348/10; 455/6.2
[58] Field of Search .............. 348/9, 10, 7, 6, 348/8, 465, 468, 473, 474, 476, 477, 478, 563, 731, 734, 906, 907; 455/3.1, 4.2, 5.1, 6.1, 6.3, 6.2; H04N 7/16, 7/173

[56] References Cited

U.S. PATENT DOCUMENTS

| | | |
|---|---|---|
| 4,264,924 | 4/1981 | Freeman . |
| 4,264,925 | 4/1981 | Freeman et al. . |
| 4,602,279 | 7/1986 | Freeman . |
| 4,868,660 | 9/1989 | Rufray .................. 358/181 |
| 5,155,591 | 10/1992 | Wachob . |
| 5,161,019 | 11/1992 | Emanuel .................. 358/183 |
| 5,194,951 | 3/1993 | Hailey et al. .................. 358/182 |
| 5,233,423 | 8/1993 | Jernigan et al. .................. 358/181 |
| 5,317,391 | 5/1994 | Banker et al. .................. 348/6 |
| 5,430,493 | 7/1995 | Kim .................. 348/564 |
| 5,452,023 | 9/1995 | Kim .................. 348/559 |
| 5,594,492 | 1/1997 | O'Callaghan et al. .................. 348/10 |

*Primary Examiner*—John K. Peng
*Assistant Examiner*—Chris Grant
*Attorney, Agent, or Firm*—Limbach & Limbach LLP

[57] ABSTRACT

A television receiver assembly including a multi-channel television signal decoder coupled to a source of incoming television signals, a multi-channel television display coupled to the decoder for displaying received decoded television signals, a channel changing device operative to change the channel decoded by the decoder and displayed by the display, the channel changing device being inoperative to display received decoded television signals during a channel changing interval, and an interval message provider operative to display at least one predetermined information message during the channel changing interval.

30 Claims, 2 Drawing Sheets

CATV MESSAGE DISPLAY DURING THE CHANGING OF CHANNELS

FIELD OF THE INVENTION

The present invention relates generally to CATV systems.

BACKGROUND OF THE INVENTION

Advanced CATV systems incorporate a multiplicity of channels for entertainment, education and other services. Although many existing CATV systems generally accommodate approximately 40 channels, there are known systems, such as the Hughes Communications DirecTV system, which provide 150 channels. It is also anticipated that future systems will accommodate approximately 500 channels.

In some of the existing broadcast methods, especially those involving encrypted digital transmissions, scrolling through channels takes a certain amount of time, typically of the order of 1 second per channel. This time, which is known as "zapping time", is a result of delays involved in tuning the decoder to a selected channel, acquiring sufficient data to display on the television and acquiring a control word to decrypt the transmissions.

Generally, during the zapping time there is no video or audio displayed on the television. If a subscriber scrolls through many channels repeatedly, zapping time periods become significant, thus creating a phenomenon which is unpleasant to the subscriber.

SUMMARY OF THE INVENTION

The present invention seeks to provide additional services which are especially applicable for use at zapping times.

The term "CATV systems" is used throughout the specification and claims in a broad sense to include any form of pay TV systems which are either one-way systems or two-way systems utilizing cable communication networks, satellite communication networks, telephone communication networks or any combination thereof.

There is thus provided in accordance with a preferred embodiment of the present invention a television receiver assembly including:

- a multi-channel television signal decoder coupled to a source of incoming television signals;
- a multi-channel television display coupled to the decoder for displaying received decoded television signals, a channel changing device operative to change the channel decoded by the decoder and displayed by the display, the channel changing device being inoperative to display received decoded television signals during a channel changing interval; and
- an interval message provider operative to display at least one predetermined information message during the channel changing interval.

Preferably, the interval message provider includes a memory for storing at least one predetermined information message for later display during a channel changing interval.

Additionally, the interval message provider provides an audio and visual information message during the channel changing interval.

Yet additionally the interval message provider includes an information message input receiving at least one information message from the source of television signals. The information message input may be received via the decoder. Alternatively, the information message input may be received via a telephone link.

Preferably, the information message is associated with a channel. The channel may be a channel which is currently viewed. Alternatively, the channel may be a channel to which tuning is changed.

There is also provided in accordance with a preferred embodiment of the present invention a method for providing information messages during channel changing intervals in television reception including:

- sensing channel-changing operation at a television receiver; and
- displaying at the television receiver a predetermined information message during a sensed channel changing interval when the receiver is inoperative to display received decoded television signals.

Preferably, the method also includes storing at least one predetermined information message for later display during a channel changing interval.

Additionally, the displaying step includes both audio and visual display of an information message during the channel changing interval.

Yet additionally, the method includes receiving at least one information message from the source of television signals.

Preferably, the at least one information message is received from the source of television signals via the decoder. Alternatively, the at least one information message is received from the source of television signals via a telephone link.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
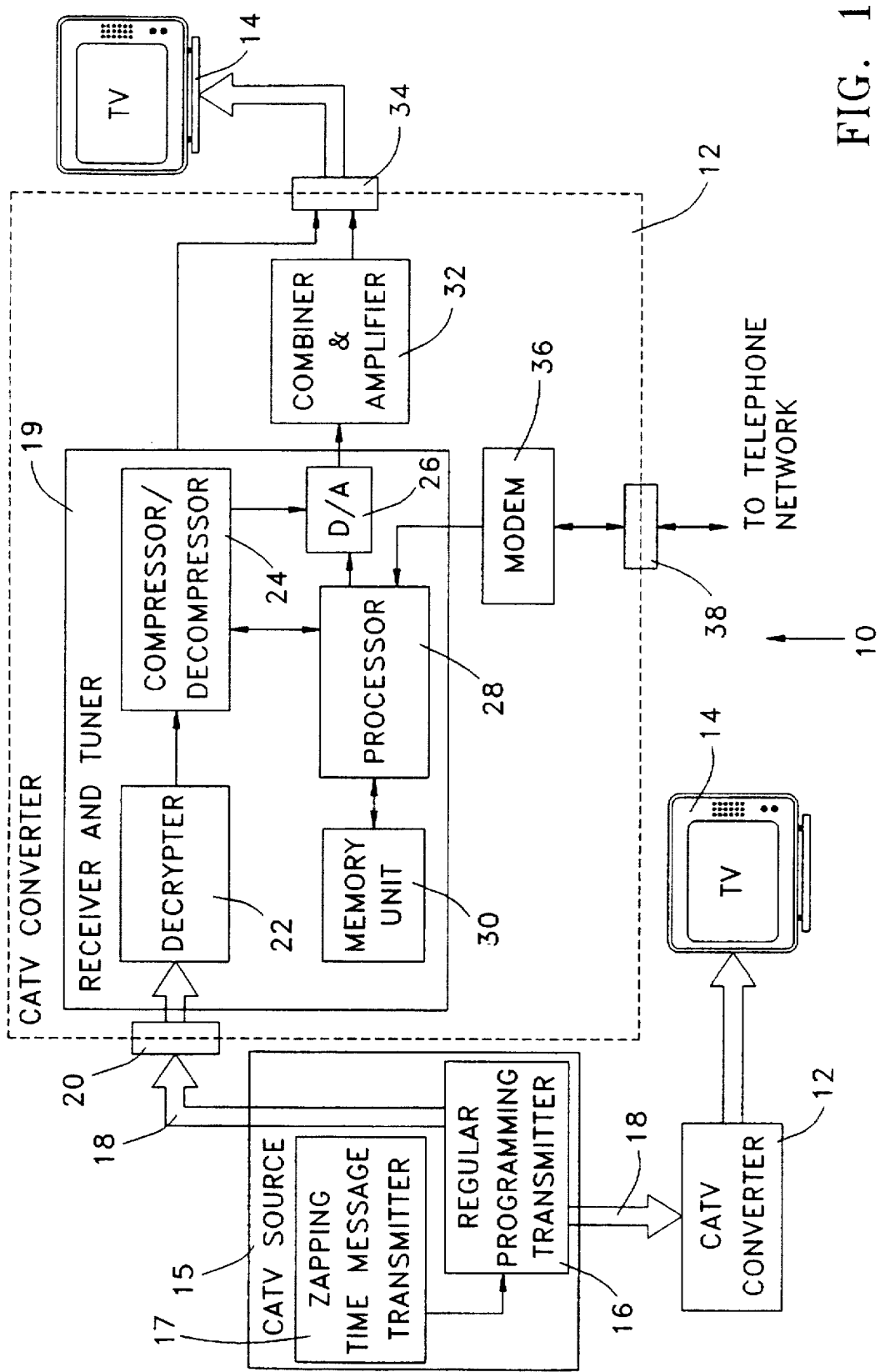
FIG. 1 is a generalized block diagram illustration of a CATV, system constructed and operative in accordance with a preferred embodiment of the present invention.

Reference is now made to FIG. 1 which is a generalized block diagram illustration of a CATV system constructed and operative in accordance with a preferred embodiment of the present invention.

A CATV system 10 generally includes a plurality of subscriber units each including a CATV converter 12 and a television 14. A CATV source 15 transmits video and audio signals to each of the subscriber units. CATV source 15 may be a satellite transmission source or a cable source. Preferably, CATV source 15 includes a regular programming transmitter 16 and a zapping time message transmitter 17. In a preferred embodiment of the present invention zapping time message transmitter 17 is coupled to regular programming transmitter 16 so that regular programming and zapping time transmissions have a common output link 18 for transmission to subscribers.

In each of the CATV converters 12, a receiver and tuner unit 19 receives the video and audio signals via a cable interface 20. The receiver and tuner unit 19 is tuned to a channel in response to a selection made by a subscriber. The subscriber may make his selection by operating a keypad (not shown) mounted on CATV converter 12 or a remote control unit (not shown).

In CATV systems which are built to decode digital transmissions, receiver and tuner unit 19 may include a decrypter 22, a compressor/decompressor 24, a digital-to-analog (D/A) unit 26, a processor 28 and a memory unit 30.

Generally, digital signals received at receiver and tuner unit 19 are encrypted and compressed. Thus, decrypter 22 is operable to decrypt the encrypted video and audio data. Decrypter 22 provides the decrypted video and audio data to compressor/decompressor 24 which is operable to decompress the compressed video and audio data. The decompressed digital data is provided to D/A 26 which converts the digital data to analog data and provides the converted data to a combiner and amplifier 32.

Compressor/decompressor 24 also provides decompressed digital data to a processor 28 which is operable to process the data and provide it to memory unit 30. Processor 28 also provides processed digital data to D/A 26 which is operable to convert the digital data generated by the processor into analog signals which are further provided to combiner and amplifier 32. It is to be appreciated that processor 28 may process messages and may enable selection of channels to be displayed on television 14. Processor 28 may also process video and audio data, slides and stills pictures in accordance with instructions received from CATV source 15 or a subscriber which programs processor 28 via a keypad (not shown) or a remote control (not shown).

Combiner and amplifier 32 provides the analog data to television 14 via a cable interface 34. It is to be appreciated that in digital high-definition-TV (HDTV) and in other forms of digital television, digital signals from processor 28 and compressor/decompressor 24 may be provided directly to television 14 without using D/A 26 and combiner and amplifier 32.

If the CATV system is a two-way system which combines a telephone link for receiving and transmitting data, CATV converter 12 may include a modem 36 which is coupled to processor 28. Modem 36 is also coupled, via a telephone interface 38, to a telephone network. Modem 36 is operable to communicate between processor 28 and a telephone facility.

In CATV systems which are built to decode analog transmissions, receiver and tuner unit 19 provides video and audio data directly to television 14 via cable interface 34. In that case compressor/decompressor 24 may be excluded and the analog video and audio data is decrypted in decrypter 22 and provided directly to television 14 via cable interface 34. Processor 28 is then operable to process data received from the telephone network via modem 36.

In analog CATV systems which do not include a modem for linking to a telephone network receiver and tuner 19 may include only the decrypter 22 which may be directly coupled to television 14 via cable interface 34.

In accordance with a preferred embodiment of the present invention CATV source 15 is operable to transmit advertisement data, preferably in the form of slides accompanied by voice data. Alternatively, the advertisement data may be transmitted by CATV source 15 in combination with the telephone network, or via the telephone network only.

The advertisement data is processed by processor 28 and stored in memory unit 30. During zapping periods, processor 28 is operable to retrieve the advertisement data from memory 30 and to provide it, via D/A 26, to combiner and amplifier 32 for displaying the advertisement data on television 14.

Preferably, separate advertisements are associated with separate channels. An advertisement is displayed on television 14 only between the times a subscriber changes his selection from a previously selected channel which he is currently viewing and the time the next selected channel is displayed on television 14. Thus, the subscriber always views, in this case, the advertisement associated with his "old" selection.

In the case that certain channels are not associated with specific advertisements, a default advertisement may be displayed on television 14 each time the channel is changed.

In yet another preferred embodiment of the invention advertisements associated with newly selected channels may be displayed instead of the advertisements associated with channels which were previously selected. Thus, the subscriber always views, in this case, the advertisement associated with his "new" selection. In such a case, however, when a subscriber scrolls quickly between many channels processor 28 enables the display of the advertisement currently stored in the memory unit 30.

The advertisements may be periodically downloaded from CATV source 15. Alternatively, advertisements may be downloaded via a telephone network and modem 36. Modem 36 provides the downloaded data to processor 28 which stores it in memory unit 30. Then, processor 28 may retrieve the data from memory 30 and provide it to combiner and amplifier 32 via D/A 26. Combiner and amplifier 32 then provides the data to television 14. It is to be appreciated that advertisement which is targeted to individual subscribers may be provided by either CATV source 15 or the telephone network.

Figure 2:
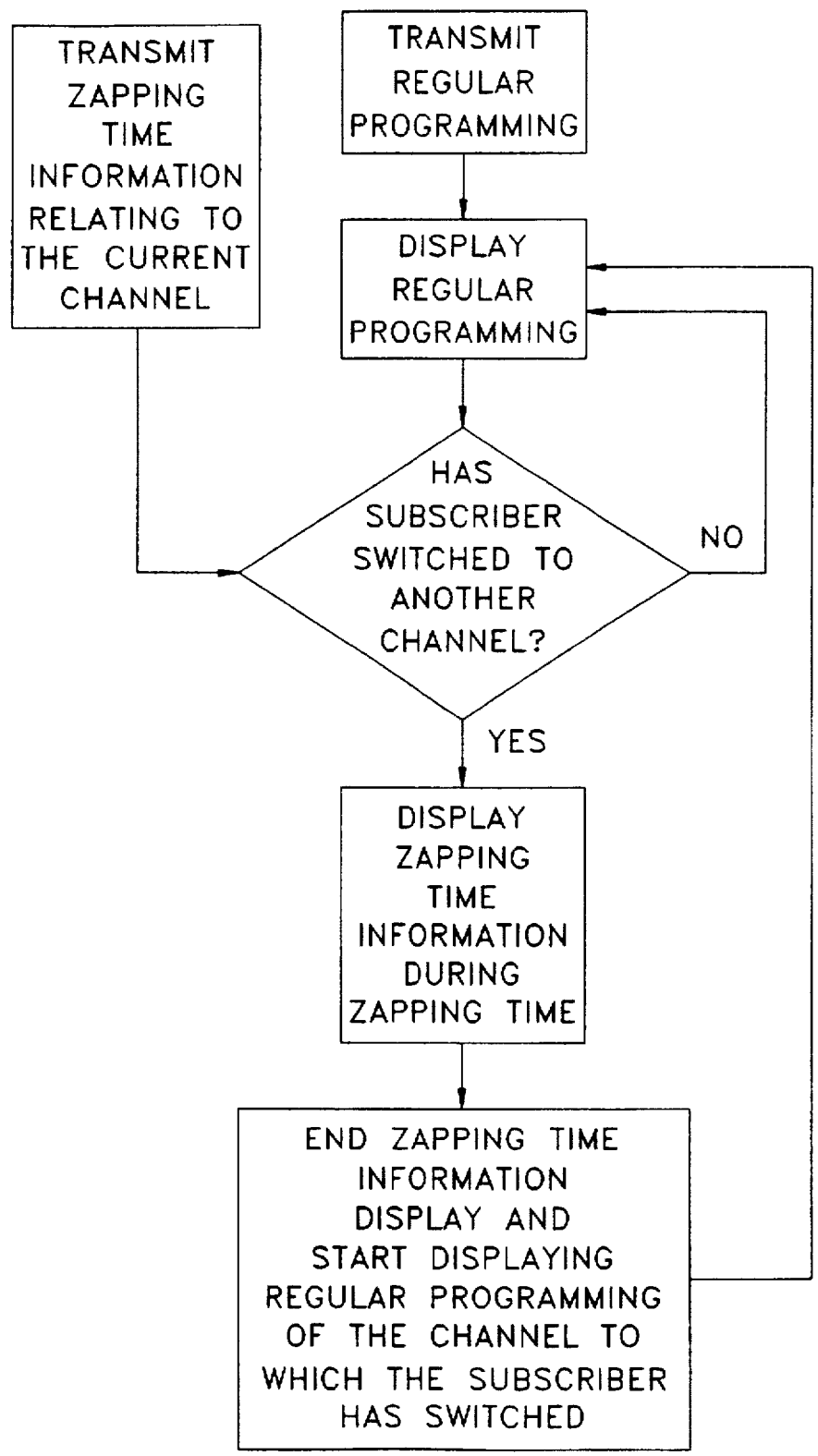
FIG. 2 is a flow chart illustration of the operation of the apparatus of FIG. 1 in accordance with a preferred embodiment of the present invention.

Reference is now made to FIG. 2 which is a flow chart illustration of the operation of the apparatus of FIG. 1 in accordance with a preferred embodiment of the present invention.

Regular CATV programming and zapping time information may be transmitted simultaneously over a CATV network. Regular CATV programming which is associated with a channel is displayed on a television at a subscriber location in accordance with selection made by a subscriber. The zapping time information is stored in a decoder which is coupled to the television.

As long as the subscriber does not change the channel currently viewed, the zapping information is not displayed. When the subscriber switches to another channel, display of the regular CATV programming associated with the channel previously viewed ceases and the zapping time information is displayed until the television is tuned to the channel to which the subscriber has switched. Then, display of the zapping time information ceases and the regular programming associated with the channel to which the subscriber has switched is displayed.

It will be appreciated by persons skilled in the art that the present invention is not limited by what has been particularly shown and described hereinabove. Rather the scope of the present invention is defined only by the claims which follow:

I claim:

1. A television receiver assembly comprising:

a multi-channel television signal decoder coupled to a source of incoming television signals;

a multi-channel television display coupled to said decoder for displaying received decoded television signals;

a channel changing device operative to change the channel decoded by the decoder and displayed by the display, the multi-channel television display being inoperative to display received decoded television signals during a channel changing interval, the channel changing interval having a beginning, an and, and a variable length; and an interval message provider operative:
   to determine the beginning of the channel changing interval;
   to begin displaying at least one predetermined information message at the beginning of the channel changing interval as determined by the interval message provider;
   to determine the end of the channel changing interval, and
   to cease displaying the at least one predetermined information message at the end of the channel changing interval as determined by the interval message provider wherein said interval message provider provides an audio and visual information message during said channel changing interval.

2. Apparatus according to claim 1 and wherein said interval message provider includes a memory for storing at least one predetermined information message for later display during a channel changing interval.

3. Apparatus according to claim 1 and wherein said interval message provider includes an information message input receiving at least one information message from said source of television signals.

4. Apparatus according to claim 2 and wherein said interval message provider includes an information message input receiving at least one information message from said source of television signals.

5. Apparatus according to claim 1 and wherein said interval message provider includes an information message input receiving at least one information message from said source of television signals.

6. Apparatus according to claim 1 and wherein said interval message provider includes an information message input receiving at least one information message from said source of television signals via at least one of said decoder and a telephone link.

7. Apparatus according to claim 2 and wherein said interval message provider includes an information message input receiving at least one information message from said source of television signals via at least one of said decoder and a telephone link.

8. Apparatus according to claim 1 and wherein said interval message provider includes an information message input receiving at least one information message from said source of television signals via at least one of said decoder, and a telephone link.

9. Apparatus according to claim 3 wherein said information message is associated with a channel.

10. Apparatus according to claim 6 wherein said information. message is associated with a channel.

11. Apparatus according to claim 9 wherein said channel is a channel which is currently viewed.

12. Apparatus according to claim 10 wherein said channel is a channel to which tuning is changed.

13. A method for providing information messages during channel changing intervals in television reception comprising:
   sensing a channel-changing operation at a television receiver, the channel changing operation initiating a channel changing interval having a beginning, an end, and a variable length;
   determining the beginning of the channel changing interval;
   beginning to display at the television receiver a predetermined information message at the beginning of the channel changing interval as determined in the determining the beginning step;
   determining the end of the channel changing interval, and ceasing to display at the television receiver the predetermined information message at the end of the channel changing interval as determined in the determining the end step wherein said beginning to display step includes both audio and visual display of an information message during said channel changing interval.

14. A method according to claim 13 and also comprising storing at least one predetermined information message for later display during a channel changing interval.

15. A method according to claim 13 and also comprising receiving at least one information message from said source of television signals.

16. A method according to claim 14 and also comprising receiving at least one information message from said source of television signals.

17. A method according to claim 13 and also comprising receiving at least one information message from said source of television signals.

18. A method according to claim 13 and also comprising receiving at least one information message from said source of television signals via at least one of said decoder and a telephone link.

19. A method according to claim 14 and also comprising receiving at least one information message from said source of television signals via at least one of said decoder, and a telephone link.

20. A method according to claim 13 and also comprising receiving at least one information message from said source of television signals via at least one of said decoder and a telephone link.

21. A television receiver system comprising:
   a multi-channel television signal decoder coupled to a source of incoming television signals;
   a multi-channel television display coupled to said signal decoder for displaying decoded television signals received from said signal decoder;
   channel changing apparatus operative to change the channel decoded by the signal decoder and displayed by the display, the signal decoder being inoperative to supply received decoded television signals to the television display during a zapping interval, the zapping interval having a variable length; and
   an interval message provider operative to display at least one predetermined information message on said television display only during said zapping interval.

22. A system according to claim 21 and wherein said zapping interval comprises a signal decoder channel tuning interval.

23. A system according to claim 21 and wherein said incoming television signals comprise digital television signals, and
   said zapping interval comprises a digital data acquisition interval.

24. A system according to claim 21 and wherein said incoming television signals comprise encrypted television signals, and said multi-channel signal decoder comprises decryption apparatus for decrypting the incoming encrypted television signals based, at least in part, on decryption control data comprised in the incoming television signals, and
   said zapping interval comprises a decryption control data acquisition interval.

25. A system according to claim 23 and wherein said incoming television signals comprise encrypted television signals, and said multi-channel signal decoder comprises decryption apparatus for decrypting the incoming encrypted television signals based, at least in part, on decryption control data comprised in the incoming television signals, and said zapping interval comprises a decryption control data acquisition interval.

26. A system according to claim 21 and wherein said incoming television signals comprise compressed television signals, and said multi-channel signal decoder comprises decompression apparatus for decompressing the incoming encrypted television signals based, at least in part, on decompression control data comprised in the incoming television signals, and said zapping interval comprises a decompression control data acquisition interval.

27. A system according to claim 23 and wherein said incoming television signals comprise compressed television signals, and said multi-channel signal decoder comprises decompression apparatus for decompressing the incoming compressed television signals based, at least in part, on decompression control data comprised in the incoming television signals, and said zapping interval comprises a decompression control data acquisition interval.

28. A television receiver system comprising:

a television signal decoder coupled to a source of incoming television signals;

a television display coupled to said signal decoder for displaying decoded television signals received from said signal decoder, said television display not receiving decoded television signals from said signal decoder during at least one television display non-reception interval which has a variable length; and an interval message provider operative to display at least one predetermined information message on said television display only during said at least one television display non-reception interval.

29. A method for displaying an information message on a television display of a television receiver system, the method comprising:

providing a multi-channel television signal decoder coupled to a source of incoming television signals;

providing a multi-channel television display coupled to said signal decoder for displaying decoded television signals received from said signal decoder;

changing the channel decoded by the signal decoder and displayed by the display, the signal decoder being inoperative to supply received decoded television signals to the television display during a zapping interval having a variable length; and displaying at least one predetermined information message on said television display only during said zapping interval.

30. A method for displaying an information message on a television display of a television receiver system, the method comprising:

providing a television signal decoder coupled to a source of incoming television signals;

providing a television display coupled to said signal decoder for displaying decoded television signals received from said signal decoder, said television display not receiving decoded television signals from said signal decoder during at least one television display non-reception interval having a variable length; and displaying at least one predetermined information message on said television display only during said at least one television display nonreception interval.

* * * * *